(12) United States Patent
Brodersen et al.

(10) Patent No.: US 11,792,256 B2
(45) Date of Patent: Oct. 17, 2023

(54) DIRECTIONAL TOUCH REMOTE

(71) Applicant: Apple Inc., Cupertino, CA (US)

(72) Inventors: Rainer Brodersen, Santa Cruz, CA (US); Alan Cannistraro, San Francisco, CA (US); Jeffrey L. Robbin, Los Altos, CA (US); Gregory Charles Lindley, Redwood City, CA (US)

(73) Assignee: APPLE INC., Cupertino, CA (US)

( * ) Notice: Subject to any disclaimer, the term of this patent is extended or adjusted under 35 U.S.C. 154(b) by 226 days.

(21) Appl. No.: 17/134,074

(22) Filed: Dec. 24, 2020

(65) Prior Publication Data

US 2021/0126960 A1   Apr. 29, 2021

Related U.S. Application Data

(63) Continuation of application No. 14/292,159, filed on May 30, 2014, now Pat. No. 10,958,707, which is a
(Continued)

(51) Int. Cl.
*H04L 67/025* (2022.01)
*G06F 3/04883* (2022.01)
(Continued)

(52) U.S. Cl.
CPC .......... *H04L 67/025* (2013.01); *G06F 3/0482* (2013.01); *G06F 3/0488* (2013.01);
(Continued)

(58) Field of Classification Search
CPC .. G07C 9/00182; H04W 76/14; H04W 12/47; H04W 12/06; H04W 88/02; G06F 1/14;
(Continued)

(56) References Cited

U.S. PATENT DOCUMENTS

| 6,765,557 B1 | 7/2004 | Segal et al. |
| 2001/0035860 A1 | 11/2001 | Segal et al. |

(Continued)

FOREIGN PATENT DOCUMENTS

| EP | 2 417 517 | 2/2012 |
| JP | 2005165733 | 6/2005 |

(Continued)

OTHER PUBLICATIONS

Office Action, dated Nov. 10, 2021, which corresponds with U.S. Appl. No. 12/434,556, 7 pages.
(Continued)

*Primary Examiner* — Hai Phan
*Assistant Examiner* — Anthony D Afrifa-Kyei
(74) *Attorney, Agent, or Firm* — Morgan, Lewis & Bockius LLP

(57) ABSTRACT

A remotely controlled device receives touch input data from a remote controller that includes a touch screen. The remotely controller device interprets the touch input data in combination with a current context of the GUI to determine an appropriate command for the current context of the GUI, and updates the GUI in response to the appropriate command. Further, the remotely controlled device sends information via a bidirectional communication protocol to the remote controller informing the remote controller of a context displaying a keyboard, and the remote controller is configured to display a keyboard on its touch screen in response to the information sent via the bidirectional communication protocol.

25 Claims, 10 Drawing Sheets

Related U.S. Application Data continuation of application No. 12/434,556, filed on May 1, 2009, now Pat. No. 8,742,885.

(51) Int. Cl.

| | | |
|---|---|---|
| *H04N 21/422* | (2011.01) | |
| *H04N 21/47* | (2011.01) | |
| *H04N 21/431* | (2011.01) | |
| *H04N 21/4227* | (2011.01) | |
| *H04N 21/482* | (2011.01) | |
| *H04N 21/643* | (2011.01) | |
| *H04N 21/41* | (2011.01) | |
| *H04M 1/72415* | (2021.01) | |
| *G06F 3/0482* | (2013.01) | |
| *G06F 3/0488* | (2022.01) | |

(52) U.S. Cl.
CPC .... *G06F 3/04883* (2013.01); *H04M 1/72415* (2021.01); *H04N 21/41265* (2020.08); *H04N 21/4222* (2013.01); *H04N 21/4227* (2013.01); *H04N 21/42204* (2013.01); *H04N 21/42224* (2013.01); *H04N 21/431* (2013.01); *H04N 21/47* (2013.01); *H04N 21/482* (2013.01); *H04N 21/64322* (2013.01); *H04M 2250/22* (2013.01)

(58) Field of Classification Search
CPC .. G06F 3/0482; G06F 3/0488; G06F 3/04883; G08B 3/10; H04L 67/00; H04L 67/02; H04L 67/025; H04N 21/4126; H04N 21/42207; H04N 21/42224; H04N 21/4227; H04N 21/431; H04N 21/47; H04N 21/482; H04N 21/64322; H04N 5/4403; H04M 2250/22
See application file for complete search history.

(56) References Cited

U.S. PATENT DOCUMENTS

| | | |
|---|---|---|
| 2003/0002638 A1 | 1/2003 | Kaars |
| 2004/0218104 A1 | 4/2004 | Smith et al. |
| 2005/0143870 A1 | 6/2005 | Yoshio et al. |
| 2007/0050054 A1* | 3/2007 | Sambandam Guruparan ............... G08C 19/28 700/83 |
| 2007/0080845 A1 | 4/2007 | Amand |
| 2007/0152976 A1 | 7/2007 | Townsend et al. |
| 2007/0229465 A1 | 10/2007 | Sakai et al. |
| 2008/0059578 A1 | 3/2008 | Albertson et al. |
| 2008/0088602 A1 | 4/2008 | Hotelling |
| 2008/0111710 A1 | 5/2008 | Boillot |
| 2008/0168368 A1 | 7/2008 | Louch et al. |
| 2008/0284726 A1 | 11/2008 | Boillot |
| 2008/0309632 A1 | 12/2008 | Westerman et al. |
| 2008/0309634 A1 | 12/2008 | Hotelling et al. |
| 2009/0143141 A1 | 6/2009 | Wells et al. |
| 2009/0153289 A1 | 6/2009 | Hope et al. |
| 2009/0199119 A1 | 8/2009 | Park et al. |
| 2009/0209346 A1 | 8/2009 | Cheng et al. |
| 2009/0239587 A1* | 9/2009 | Negron ............... H04L 12/2836 455/566 |
| 2010/0164745 A1 | 1/2010 | Migos et al. |
| 2010/0088361 A1* | 4/2010 | Oliver ............... G06Q 30/0641 709/203 |

FOREIGN PATENT DOCUMENTS

| | | |
|---|---|---|
| JP | 2005348036 A | 12/2005 |
| JP | 2006295590 A | 10/2006 |
| JP | 2008177939 A | 7/2008 |
| WO | WO 2009/033533 A1 | 3/2009 |

OTHER PUBLICATIONS

Anonymous, "Universal Remote—Wikipedia", https://en.wikipedia.org/w/index.php?title=Universal remote&oldid=279060951, Mar. 23, 2009, 3 pages.
Panasonic Exhibition Blog, "No Buttons, but still a remote control? The 'Easy Touch Remote Controller,'" CEATEC, Japan 2008, Edited by Hiro, Oct. 3, 2008, Http://ex-blog.panasonic.co.jp/exhibition/en2008/10/ceatec08_520.html, 1 page.
Office Action, dated Sep. 16, 2011, 18 pages.
Final Office Action, dated Mar. 27, 2012, 13 pages.
Office Action, dated Jun. 21, 2013, 13 pages.
Notice of Allowance, dated Jan. 27, 2014, 13 pages.
Office Action, dated Dec. 6, 2012, which corresponds with U.S. Appl. No. 12/434,556, 3 pages.
Office Action, dated Jun. 27, 2013, which corresponds with U.S. Appl. No. 12/434,556, 4 pages.
Notice of Allowance, dated Dec. 6, 2013, which corresponds with U.S. Appl. No. 12/434,556, 3 pages.
Decision to Grant, dated Sep. 2, 2014, which corresponds with U.S. Appl. No. 12/434,556, 5 pages.
Office Action, dated Nov. 7, 2013, which corresponds with U.S. Appl. No. 12/434,556, 7 pages.
Decision to Grant, dated Jun. 30, 2016, which corresponds with U.S. Appl. No. 12/434,556, 1 page.
Office Action, dated Mar. 15, 2018, which corresponds with U.S. Appl. No. 12/434,556, 5 pages.
Oral Summons, dated Mar. 13, 2019, which corresponds with U.S. Appl. No. 12/434,556, 14 pages.
Decision to Grant, dated Jul. 30, 2020, which corresponds with U.S. Appl. No. 12/434,556, 2 pages.
Patent, dated Aug. 26, 2020, which corresponds with U.S. Appl. No. 12/434,556, 6 pages.
Patent, dated Apr. 13, 2017, which corresponds with U.S. Appl. No. 12/434,556, 2 pages.
Office Action, dated Feb. 25, 2013, which corresponds with U.S. Appl. No. 12/434,556, 7 pages.
Final Office Action, dated Aug. 2, 2013, which corresponds with U.S. Appl. No. 12/434,556, 8 pages.
Office Action, dated Jun. 12, 2013, which corresponds with U.S. Appl. No. 12/434,556, 3 pages.
Office Action, dated May 18, 2016, 10 pages.
Final Office Action, dated Dec. 27, 2016, 11 pages.
Office Action, dated Sep. 26, 2017, 12 pages.
Final Office Action, dated Apr. 25, 2018, 14 pages.
Notice of Allowance, dated Nov. 13, 2020, 8 pages.
International Search Report and Written Opinion, dated Nov. 12, 2010, which corresponds with U.S. Appl. No. 12/434,556, 11 pages.
International Preliminary Report on Patentability, dated Nov. 1, 2011, which corresponds with U.S. Appl. No. 12/434,556, 8 pages.
Extended European Search Report, dated Oct. 20, 2016, which corresponds with U.S. Appl. No. 14/292,159, 13 pages.
Extended European Search Report, dated Jan. 14, 2021, which corresponds with U.S. Appl. No. 14/292,159, 17 pages.
Intention to Grant, dated Feb. 6, 2023 received in European Patent Application No. 20192716.7, which corresponds with U.S. Appl. No. 12/434,556, 8 pages.

\* cited by examiner

DIRECTIONAL TOUCH REMOTE

RELATED APPLICATIONS

This application is a continuation of U.S. patent application Ser. No. 14/292,159, filed May 30, 2014, which is a continuation of U.S. patent application Ser. No. 12/434,556, filed May 1, 2009, now U.S. Pat. No. 8,742,885, each of which is hereby incorporated by reference in its entirety.

TECHNICAL FIELD

The present technology is related to remote controls and specifically touch device remote controls.

INTRODUCTION

As devices become more complex so do the remotes that control them. The earliest remotes were effective for their simplicity, but as technology progressed they lacked in the way of functionality. Today it is common to find remotes with upwards of fifty buttons, each often having multiple functions. Such remotes often require close study to learn the function of a button and frequently have buttons so small that accidental commands are too often given.

Buttons are convenient because they provide tactical feedback of giving a command and in some cases a select few buttons can even have a different feel or shape to facilitate the ability to operate the remote with minimum visual confirmation that the correct button is being selected. Even with shapes or textures, too often a user's focus is taken off of the remotely controlled device and focused on the remote—an undesirable consequence of a complicated interface.

Touch screen remotes attempt to solve some of these problems but can create others. While touch screen remotes are able to display less options on the screen at one time by having the user navigate menus to find the appropriate command, touch screens always have required the user to view the remote. Since touch screens do not have tactile feedback that allows the user to confirm which selection is made, the user must visually confirm the selection, which is undesirable.

Other touch screen remotes are application specific and require two-way communication wherein the remotely controlled device instructs the remote to display a certain graphical user interface. The user must view the remote to make selections because the interface on the controller changes according to the context of the display of the remotely controlled device. Further these remotes have the drawback that they can sometimes operate too slowly for a remote application owing to the back and forth communication between the remote and the remotely controlled device.

Still other touch screen remotes control a cursor displayed on the remotely controlled device. While these remotes can be operated by viewing the remotely controlled device instead of the remote itself, they can require too much user effort to enter a command. The user must undergo the cumbersome steps of navigating a cursor to a menu and selecting the command. This type of interaction is removed from the simple click and control benefits of earlier remotes.

Accordingly, a simple remote that is capable of operation without viewing a display of the remote, and which operates quickly and efficiently while minimizing accidental command inputs is desirable.

SUMMARY

Additional features and advantages of the concepts disclosed herein are set forth in the description which follows, and in part will be obvious from the description, or may be learned by practice of the described technologies. The features and advantages of the concepts may be realized and obtained by means of the instruments and combinations particularly pointed out in the appended claims. These and other features of the described technologies will become more fully apparent from the following description and appended claims, or may be learned by the practice of the disclosed concepts as set forth herein.

The present disclosure describes methods and arrangements for remotely controlling a device with generic touch screen data by displaying a Graphical User Interface (GUI) comprising a plurality of contexts on a display device for controlling at least some functions of a device. Data characterizing a touch event can be received and interpreted or translated into a list of available commands. These commands can effect an action by the device in response to the touch data as interpreted in view of the context of the GUI.

The present disclosure further includes a computer-readable medium for storing program code effective to cause a device to perform at least the steps of the method discussed above, and throughout this description.

In some instances the same touch event can affect the same action in multiple GUI contexts, but in other instances, the same touch can affect different actions in different interface contexts.

Any portable electronic device is useful to act as the remote including a cell phone, smart phone, PDA or portable media player.

Likewise any number of devices can be controlled by the remote include a multimedia management program and a player or a digital video recorder or a television-tuning device such as a television, or cable box.

Also disclosed is a multiple function device running an application causing the multiple function device to act as a remote control. A touch screen device displaying a graphical user interface comprising an unstructured touch sensitive area is provided. The touch screen can be configured to receive a variety of inputs in the form of touch gestures in the unstructured touch sensitive area and to interpret the gestures into electronic signals, the unstructured touch sensitive area comprising at least a region having no individually selectable features. The device also comprises a processor for receiving the electronic signals from the touch sensitive area and translating the signals into at least position, movement, and durational parameters. Additionally, a communications interface is provided for receiving the parameters from the processor and sending the parameters to a device to be remotely controlled for interpretation. The communications interface can use at least a protocol that can be used in a substantially unidirectional fashion, to send the parameters to the remotely controlled device, whereby no input confirmation is received on the remote control device.

In some embodiments a method of remotely controlling an application, selected from a plurality of possible applications on the same or a plurality of different remote devices is disclosed. Data representative of touch inputs can be received into an unstructured portion of a touch screen interface. The data can be received by a remotely controlled device or device hosting a remotely controlled application and interpreted into a set of available events recognizable by the remotely controlled device or application. Based on a set of available events a GUI associated with a context can be updated. The update can be in response to a selection of an event from the set of available events recognizable by the remotely controlled application that is selected based on the context associated with the displayed GUI.

BRIEF DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

DETAILED DESCRIPTION

Various embodiments of the disclosed methods and arrangements are discussed in detail below. While specific implementations are discussed, it should be understood that this is done for illustration purposes only. A person skilled in the relevant art will recognize that other components, configurations, and steps may be used without parting from the spirit and scope of the disclosure.

Figure 1:
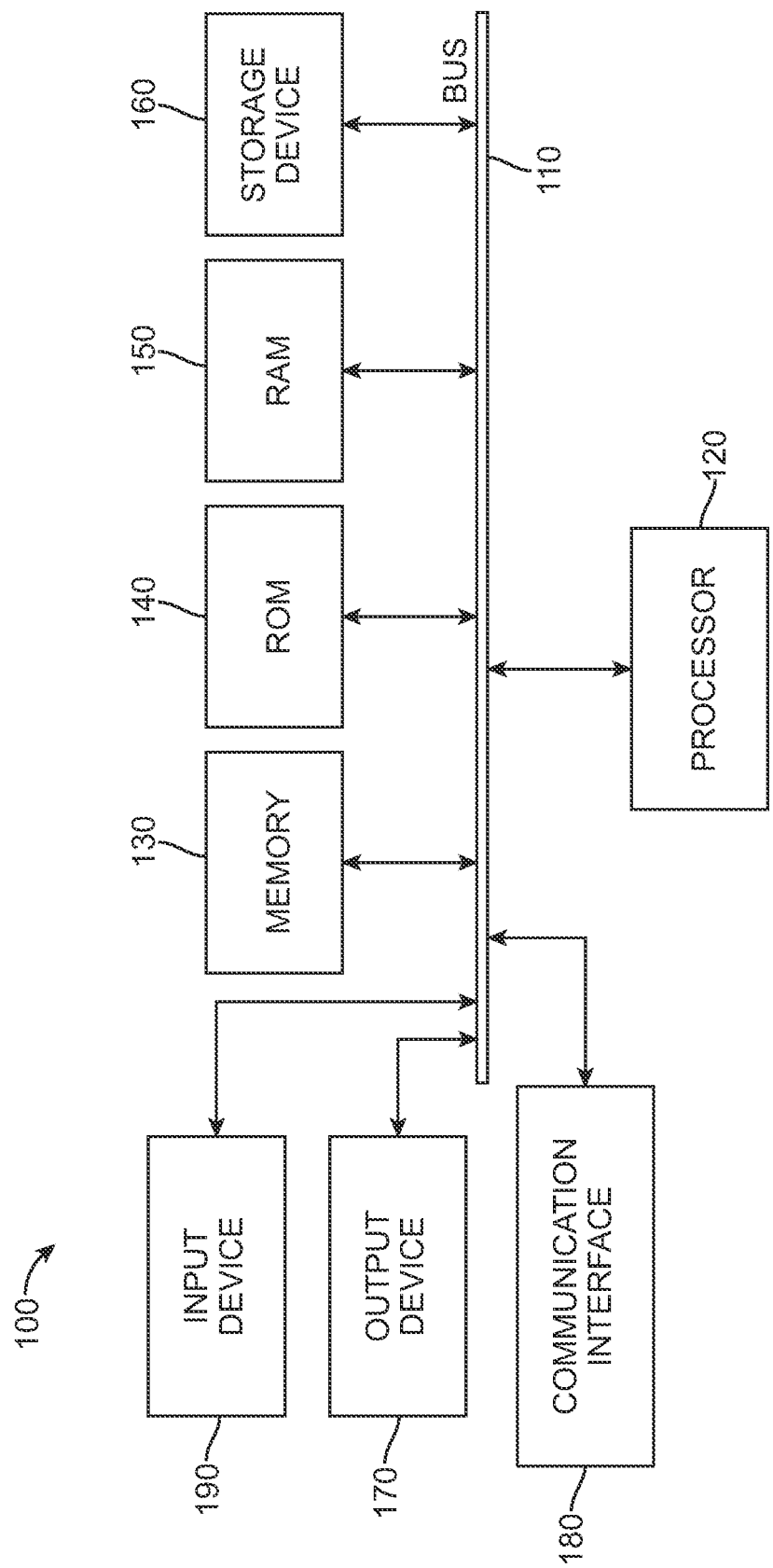
FIG. 1 illustrates an example computing device.

With reference to FIG. 1, a general-purpose computing device 100 which can be portable or stationary is shown. The general-purpose computing device can be suitable for carrying out the described embodiments or in some embodiments two or more general-purpose computing devices can communicate with each other to carry out the embodiments described below. The general purpose computing device 100 is shown including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the system may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a large computer server.

Although the exemplary environment described herein employs a hard disk, it should be appreciated by those skilled in the art that other types of computer readable media which can store data that is accessible by a computer, such as magnetic cassettes, flash memory cards, digital versatile disks, cartridges, random access memories (RAMs), read only memory (ROM) may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The device output 170 can also be one or more of a number of output mechanisms known to those of skill in the art. For example, video output or audio output devices which can be connected to or can include displays or speakers are common. Additionally, the video output and audio output devices can also include specialized processors for enhanced performance of these specialized functions. In some instances, multimodal systems enable a user to provide multiple types of input to communicate with the computing device 100. The communications interface 180 generally governs and manages the user input and system output. There is no restriction on the disclosed methods and devices operating on any particular hardware arrangement and therefore the basic features may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments can be implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

The present system and method is particularly useful for remotely controlling a device having one or more menus via a remote touch interface having at least an unstructured primary input area. A user can provide inputs to a touch interface without needing to view the interface and yet still achieve the desired response from the remotely controlled device. The primary input area of the touch interface may or may not have a background display, such as on a typical touch screen, but the primary input area of the touch interface should be unstructured. In other words, in preferred embodiments, the primary input area of the touch interface should not have independently selectable items, buttons, icons or anything of the like. Since the touch interface is unstructured, the user does not have to identify any selectable buttons. Instead the user can input a gesture into the interface and watch the device respond. In some embodiments, the system does not provide any other visual confirmation.

Figure 2:
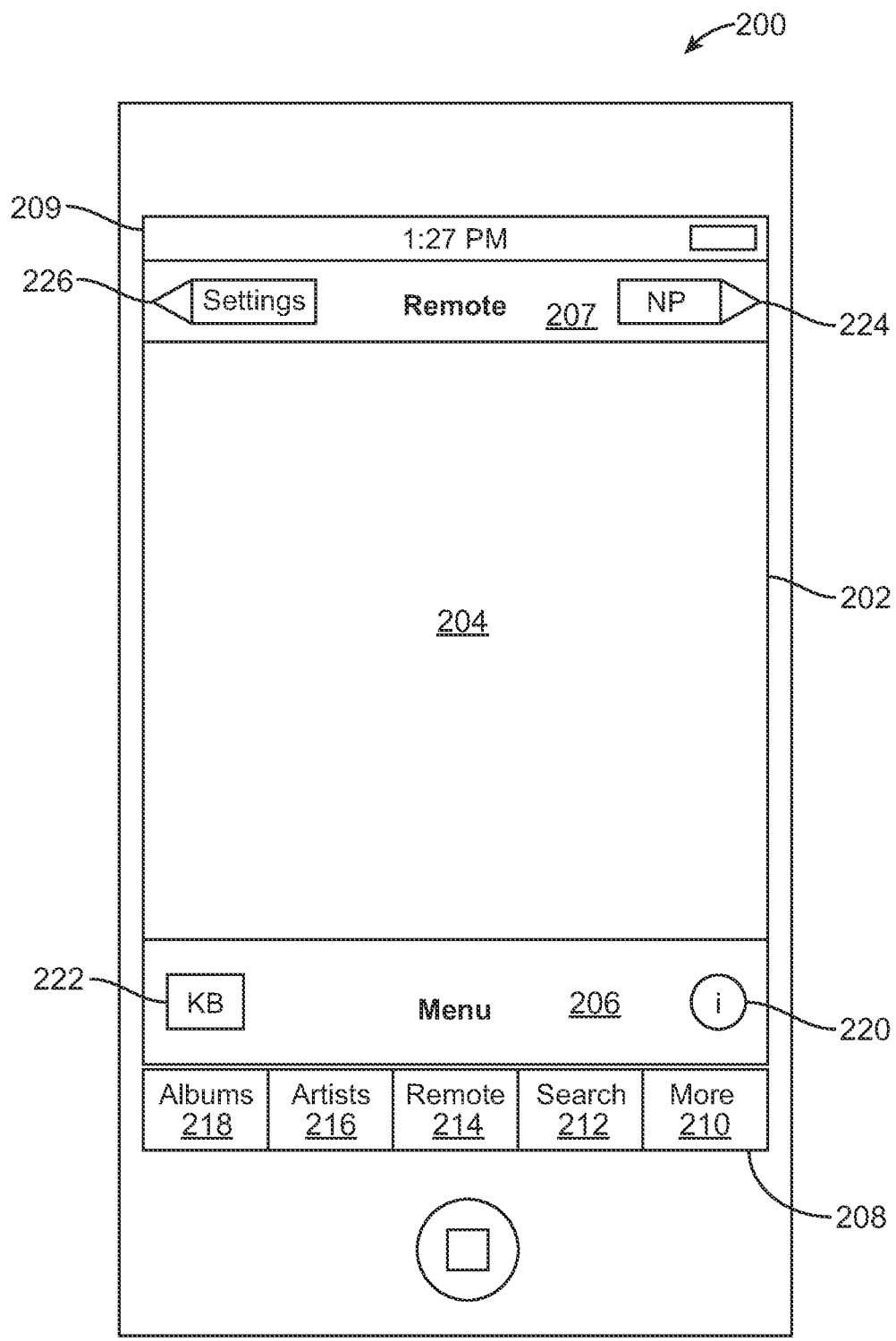
FIG. 2 illustrates an example interface embodiment for a remote control device.

FIG. 2 illustrates an example remote embodiment. A remote 200 (also sometimes called remote device 200) is shown running an application or other software routine providing the interface. While in the displayed embodiment, remote 200 is shown having a touch screen interface 202, the interface could be any touch sensitive interface, such as, for example, a capacitive sensing touch pad. Further, the remote device itself can be a dedicated remote device or a portable electronic device having other functions such as a smart phone or portable music playing device or a PDA.

The touch sensitive interface 202 comprises a primary touch sensitive area 204, which can receive the majority of the user touch inputs. In the displayed embodiment, the touch sensitive interface also comprises other touch sensitive areas including a menu area 206, a navigation bar 207, a tab bar 208, and a status bar 209.

The primary touch sensitive area 204 is an unstructured area, having no individually selectable items such as buttons or icons. Further, since area 204 is unstructured, there are no selectable items to select or avoid and therefore the primary touch sensitive area is especially conducive to providing input to the remote without needing to view the remote itself. Instead a user can view the remotely controlled device for feedback.

Starting with the navigation bar 207, two independently selectable buttons are displayed. Back button 226, shown here labeled "Settings" because in this example illustration a user can return to the settings menu, can be selected to return the user to the previous screen. The button's label can change to display the name of the screen that the user will be returned to if the button is selected. Button 224 acts as a forward button, but in most cases takes the user to a "Now Playing Screen" (abbreviated as NP) which is present when the remotely controlled device is playing audio or video. It should be appreciated here and throughout the document that that while many of the buttons in the remote interface are indicated as having a specific name, the labeling is not intended to be limiting.

The entire menu area 206 is a touch sensitive area which records inputs to return to the previous menu by receiving taps in the menu area, or to return to the top-level-menu by receiving and detecting a press and hold action. In the illustrated embodiment two other buttons are present. Keyboard button 222 and information button 220 can be displayed when they are needed and not displayed when they are not needed. For example, when a keyboard is present on the user interface of the remotely controlled device, the keyboard button 222 can appear. Selecting the keyboard button 222 can cause a keyboard to appear on the remote interface for easier typing into the remotely controlled device's interface. Similarly, information button 220 can be displayed when an item is displayed on the remotely controlled device's interface for which information is available.

Buttons 220 and 222 are located near the outer edges of the menu area 206 and of the screen 202 in general. Locating buttons 220 and 222 in the corner of the interface helps avoid accidental selections, as it is expected that a user would rarely hit one of the corners of the device accidently.

In some embodiments, the remote device 200 can be a mobile phone, smart phone, portable multimedia player, PDA or other portable computing device capable of a diverse set of functions. In these embodiments a tab bar 208 can be useful to navigate between other functions on the remote device. The tab bar 208 can be a structured touch sensitive area with selectable buttons for this purpose. For example button 218 can instruct the remote device 200 to switch to the albums menu, or button 216, the artists menu, button 212, a search screen. Button 210 can provide additional options. Remote button 214 can return the remote device back to the remote interface.

In some embodiments one or all of areas 206, 207, 208, and 209 may not be present as part of the remote interfaces. In some other embodiments area 206, 207, 208, and 209 can ignore inputs in various contexts so as to avoid accidental selection. For example, when the remote device is held in a substantially horizontal fashion, all individually selectable inputs can be made unselectable, and in complimentary fashion, when the device is held at a substantially vertical angle, the individually selectable inputs can be active to be selected.

In some embodiments, one method to prevent accidental selection requires a selection action to both start and end within the individually selectable area. For example, to activate the menu area, the touch must start and end within the menu area 206. If a touch were to either begin or end outside of the menu area but in the primary touch sensitive area 204, then the input can be considered to be an input of the type usually given and detected in the primary touch sensitive area 204.

Figure 3:
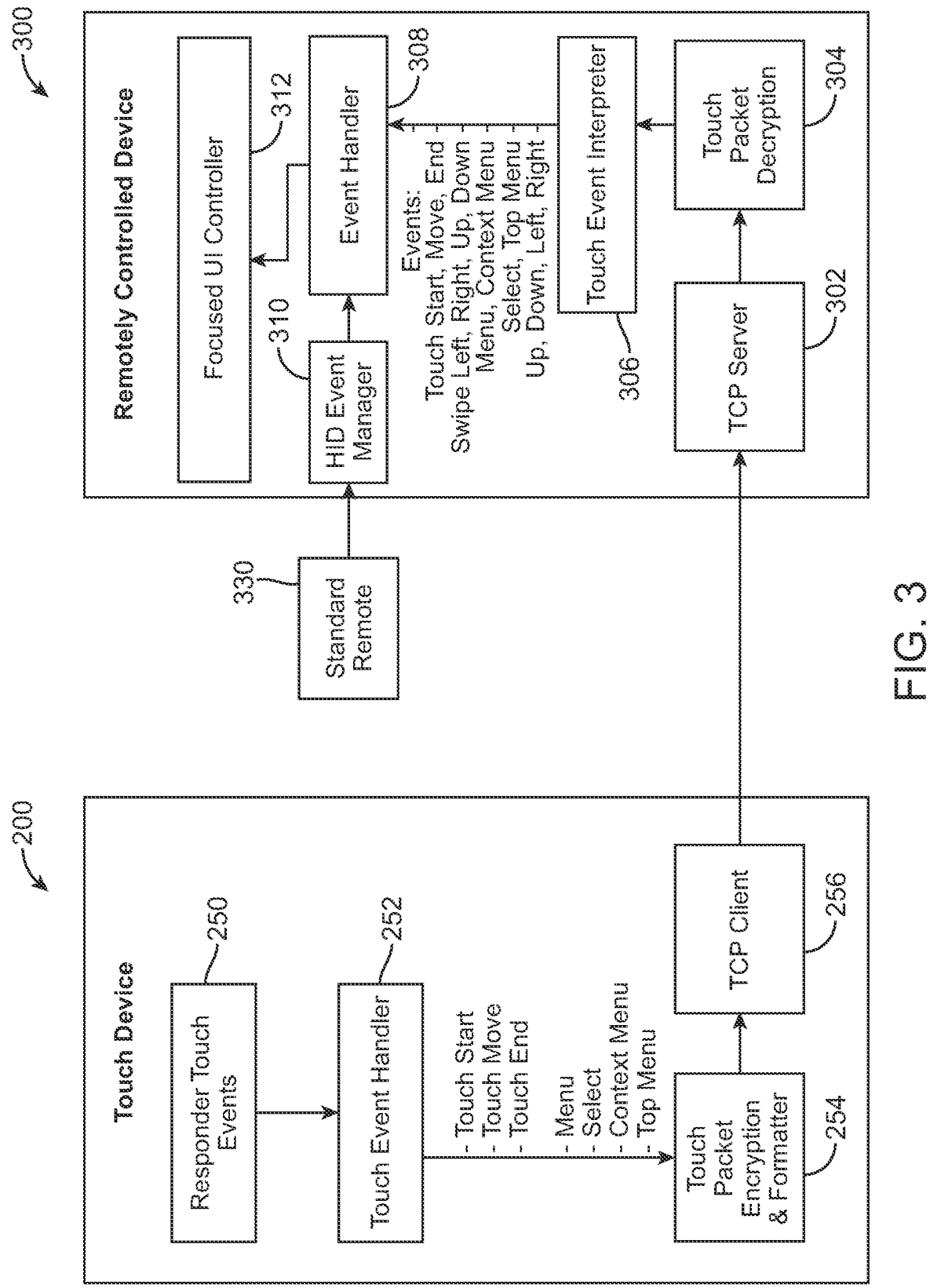
FIG. 3 illustrates an example functional diagram system embodiment.

As illustrated in FIG. 3 touch device 200 receives touch events from the user as they are input using a Responder Touch Events Module 250 which passes the touch events to a Touch Event Handler 252. Touch Event Handler 252 interprets the touch events received by the Responder Touch Events Module 250 to identify information about the touch event. For example Touch Event Handler can identify the pixel location of the touch start, the pixel of the touch end, and identify touch movement. It also interprets the duration of the touch event. The Touch Event Handler 252 can interpret whether the touch event resulted in a menu input, a selection action, context menu input or top menu input. This information is formatted into packets and encrypted by the Touch Packer Encryption and Formatter module 254 and sent by the TCP Client 256 to the remotely controlled device 300.

While FIG. 3 illustrates a TCP Client 256 for transferring data from the remote 200 to the remotely controlled device 300, any protocol can be used to send data from device 200 to 300. However, in this embodiment TCP is discussed for speed benefits. TCP can be configured work in a substantially unidirectional fashion without requiring handshakes or other unnecessary communication that can increase latency in the transmission of data from the remote to the remotely controlled device. It will be appreciated that whatever technology, whether a direct device-to-device connection or over a local area network is chosen, it should allow relatively fast and reliable delivery of the information sent by the touch device 200.

Additionally, for purposes of speedy transmission of commands from the touch device 200 to the remotely controlled device 300 the amount of data sent should be kept to minimum. In some embodiments the amount of data transferred comprises around 20 bytes up to about 50 bytes per packet. While it can be appreciated that the touch interface of the touch device 200 is a versatile instrument and is capable of recording and interpreting data into more complex instructions for the remote device, complexity is not beneficial. Instead simple information is recorded and transmitted by touch device 200.

Shown below is an example of data that can be sent from the touch device 200. In this embodiment, enough data is sent that the remotely controlled device can interpret the data into the commands necessary to control the device, but at the same time the amount of transmitted data is kept to a minimum. Data sent by the touch device 200 includes information such as the touch position (start and/or end of touch event), number of digits contacting the touch interface, the type of event, velocity of the touch (alternatively, the duration of the touch event can be transmitted to allow the remotely controlled device to calculate the velocity). The touch device also can send more specific information such as individually selectable items that have been selected, as can be seen in the example below. It should be appreciated that there are many different formats, quantities and types of data that can be used, and the example below is not meant to limit the scope of possibilities for this function.

embodiment illustrated FIG. 3, the remote sends largely generic touch device data and leaves the interpretation of the data to the remotely controlled device 300. For example, TCP server 302 receives the TCP data transmission from a TCP client 256 and the data is decrypted with module 304.

The generic touch data, (touch start, move, end, time/velocity) can be interpreted by an interpreter such as Touch Event Interpreter 306 that interprets the generic touch event data into events that can be understood and used by the remotely controlled device 300. In this example, the information such as touch start, move and end that was recorded by the remote 200 can be interpreted into events, left, right, up, down, swipe left, swipe right, swipe up, swipe down or interpreted in a generic way as touch start, move or end.

Also illustrated is an Event Handler 308, which can receive inputs and pass them onto a controller for a graphical user interface. As illustrated, the Event Handler 308 can receive events originating from a standard remote control 330 that have been received and interpreted by the Human Interface Event Manager 310, and can also receive events that originate from the touch device 200 that have been interpreted by the Touch Event Interpreter 306.

One or more UI controllers control each graphical user interface of the remotely controlled device. As illustrated in FIG. 3, the UI controller is labeled as a Focused UI controller 312 because it represents the UI controller that is associated with the GUI that is currently being displayed by the remotely controlled device. While there can be many UI controllers, the focused UI controller is the controller that is associated with the GUI screen currently displayed.

The focused UI controller 312 receives events from the event handler 308. The focused UI controller 312 receives all of the possible inputs and reacts to whichever input the focused UI controller is configured to accept.

```
typedef struct
{
    UInt32          size;            // size of the data structure (20 bytes)
    RCRemoteNavigationEventType
                    eventType;       // see RCRemoteNavigationEventType below
    CGPoint         position;        // touch position at time of event
    UInt32          extendedValue;   // if eventType == kRCNavTouchStart: Number of
                                     //     touch digits
                                     // if eventType is kRCNavTouchMove or
                                     //     kRCNavTouchEnd: y and Y
                                     //     velocity in pixels/second
                                     // All other event types: undefined
    NSTimeInterval  timestamp;       // event time stamp
} DRTouchEvent;
typedef enum {
    kRCNavButtonSelect,
    kRCNavButtonMenu,
    kRCNavButtonContextMenu,
    kRCNavButtonTopMenu,
    kRCNavTouchStart,
    kRCNavTouchMove,
    kRCNavTouchEnd,
} RCRemoteNavigationEventType;
```

The above example should not be considered exclusive. For example, the above data includes the number of digits in contact with touch screen and the location of one of those digits. In some embodiments, if two or more digits are in contact with the touch screen, the location coordinates of all digits can be recorded and sent to the remotely controlled device.

Figure 4:
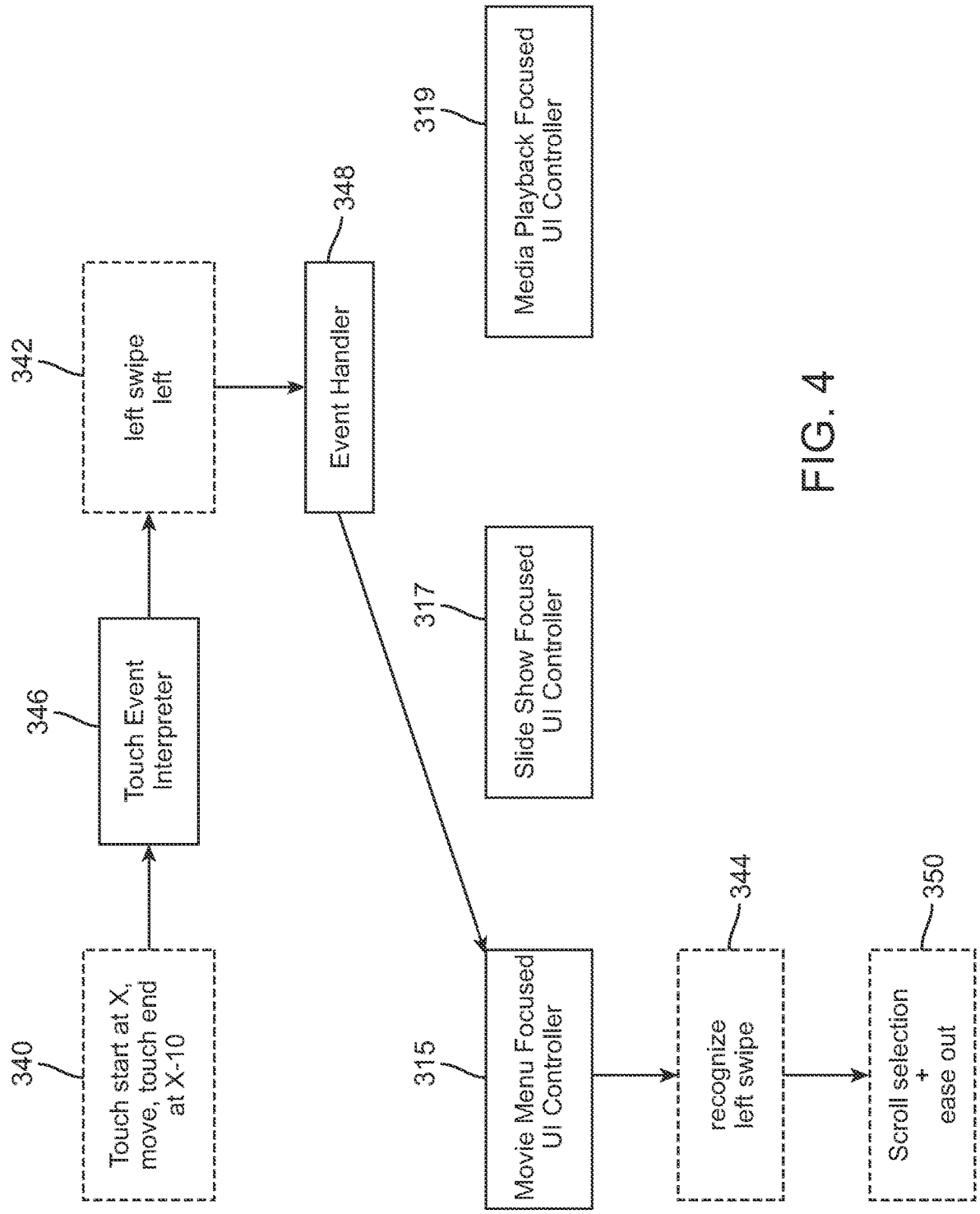
FIG. 4 illustrates an example flow diagram of a focused UI controller function embodiment.
Figure 5:
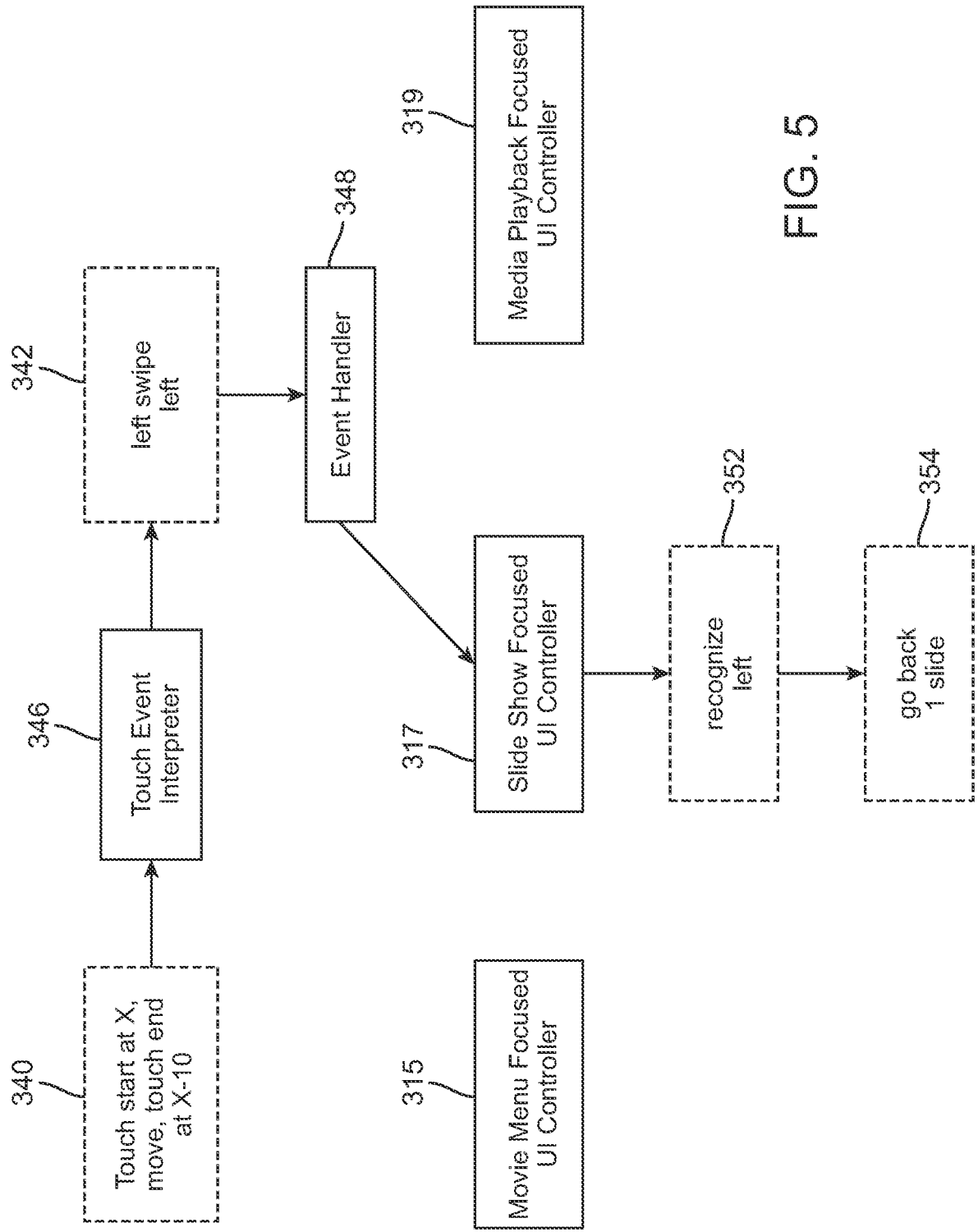
FIG. 5 illustrates an example flow diagram of a focused UI controller function embodiment.
Figure 6:
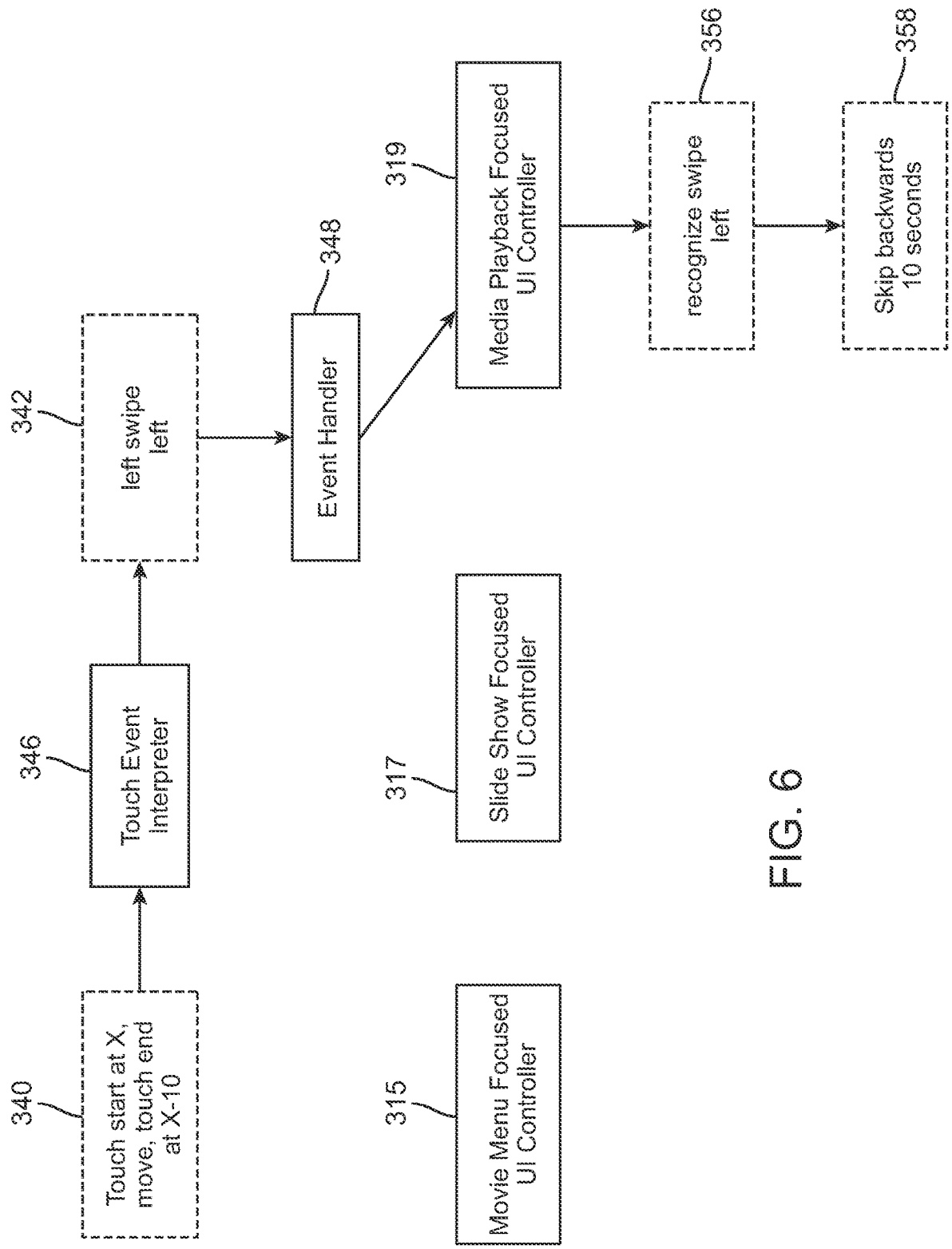
FIG. 6 illustrates an example flow diagram of a focused UI controller function embodiment.

In the remote context it is important that the commands from the remote 200 are transmitted and received by the remotely controlled device 300 quickly. Therefore, in FIGS. 4-6 illustrate how different focused UI controllers handle the same set of touch events. At 340 a user enters a gesture that begins at an arbitrary point X on the touch interface and ends a point X-10, which is left of X and the touch gesture has some velocity. The touch input is received, processed, and sent to the remotely controlled device as described above. At the remotely controlled device, the touch event interpreter 346 receives the data descriptive of the touch input and can interpret the data into events 342 that can be recognized by the remotely controlled device. In this example, the touch event interpreter outputs a swipe left event and a left event.

The event handler 348 passes the left event and swipe left event to the UI controller that is currently "in focus." A UI controller is said to be "in focus" when it is controlling at least a portion of the currently displayed user interface screen. The focused UI controller receives the events from the event handler 348. In FIGS. 4-6, three different focused UI controllers exist. A movie menu focused UI controller 315, a slide show focused UI controller 317, and a media playback focused UI controller 319. In FIG. 4, the movie menu focused UI controller 315 receives the touch events 342 from the event handler 348 and recognizes the left swipe event at 344 and causes the UI to appear to scroll through the selections and ease out of the scroll operation at 350. In FIG. 5, the slide show focused controller 317 is the active controller and it recognizes the left event at 352, which results in the user interface returning to the previous slide in the slide show at 354. In FIG. 6, the media playback focused UI controller 319 is the active controller and it recognizes the swipe left event at 356, which results in the user interface returning to the previous slide in the slide show at 358. Together FIGS. 4-6 illustrate how the same touch input can be recognized as several different events and the focused UI controllers choose from the events to cause an action in the user interface.

While in the examples illustrated in FIGS. 4-6, the focused UI controllers only recognized one of the two input events, it can be possible that the focused UI controller can recognize multiple events as being tied to actions. For example, the movie menu controller could have recognized both the swipe event and the left event, but in such cases, the focused UI controller can be configured to choose one event over the other if multiple events are recognized.

At this point it is informative to compare how the currently described technology works in comparison to a standard remote 330 in FIG. 3. One way to conceptualize the remote 200 is as a universal remote that can output the same data regardless of the device it is communicating with. It is a remote that has an unstructured interface and therefore any gesture or command can be input. In contrast, remote 330 is specific to the remotely controlled device. For the purposes of this discussion, the remote is a simple remote having only a menu button, up, down, left and right. The remotely controlled device is configured to accept inputs from remote 330 and each input is tied to a function in the remotely controlled device. Even a traditional universal remote is programmed to work in the same matter as remote 330 outputting commands that are specific to the remotely controlled device.

Inputs from the touch device 200 are received by the touch event interpreter 306 which can interpret the touch data into touch events that can potentially be used by the remote device. The event handler 308 forwards the events to the focused UI controller 312. An input from the standard remote 330 can be received by the human interface device event manager 310 and interpreted into an event that can be used by the touch device. Just as with the events received from the touch device 200, the event handler 308 can forward the command from the standard remote 330 to the focused UI controller 312.

In some embodiments the focused UI controller 312 can be configured to accept additional inputs beyond that which is possible using the standard remote 330. In such embodiments, the focused UI controller 312 can choose from among the inputs that it wants to accept. In these embodiments the focused UI controller 312 is configured to make this choice. For example the focused UI controller 312 can be informed that it is receiving events from the touch device 200 and consider those commands more preferable than the simplistic inputs, such as a left event, given by the standard remote 330. In such a case, if the focused UI controller 312 were to receive events from the touch device 200 it would need to choose from the simple event or the higher-level event, such as a swipe, since both are represented. The focused UI controller 312 can learn that the data is from the touch device 200 and choose to a fast forward a movie based on the swipe input as opposed to skipping a movie chapter based on a left event.

Just as the focused UI controller 312 can be configured to accept different commands based on which device is receiving the commands it can also interpret the commands based on the context of the interface that is currently displayed. As mentioned above, each focused UI controller is specific to a different context. There can be many more UI controllers each responsible for their own function. Since each UI controller is responsible for a different part of the UI or different screen having a different context, each focused UI controller can perform different functions given the same input.

As discussed above, a user can provide a variety of inputs into the primary touch sensitive area 204, but the result of the inputs can vary depending on the context in which the input is given. The focused UI controller that is specific to a particular GUI can be programmed to interpret inputs based on elements or characteristics of its context. For example in the case of a remote controlling a multimedia application running on a remote device, for example ITUNES or APPLE TV both by APPLE INC of Cupertino, CA, there can be at least a menu context (FIG. 7) and a media playback context (FIG. 8) each having their own focused UI controller governing their behavior. While controlling an multimedia application remotely is discussed as one exemplary embodiment, many other devices can be controlled according to the concepts discussed herein including, but not limited to, televisions, cable boxes, digital video records, digital disc players (DVD, CD, HD-DVD, blu ray etc.).

Figure 7:
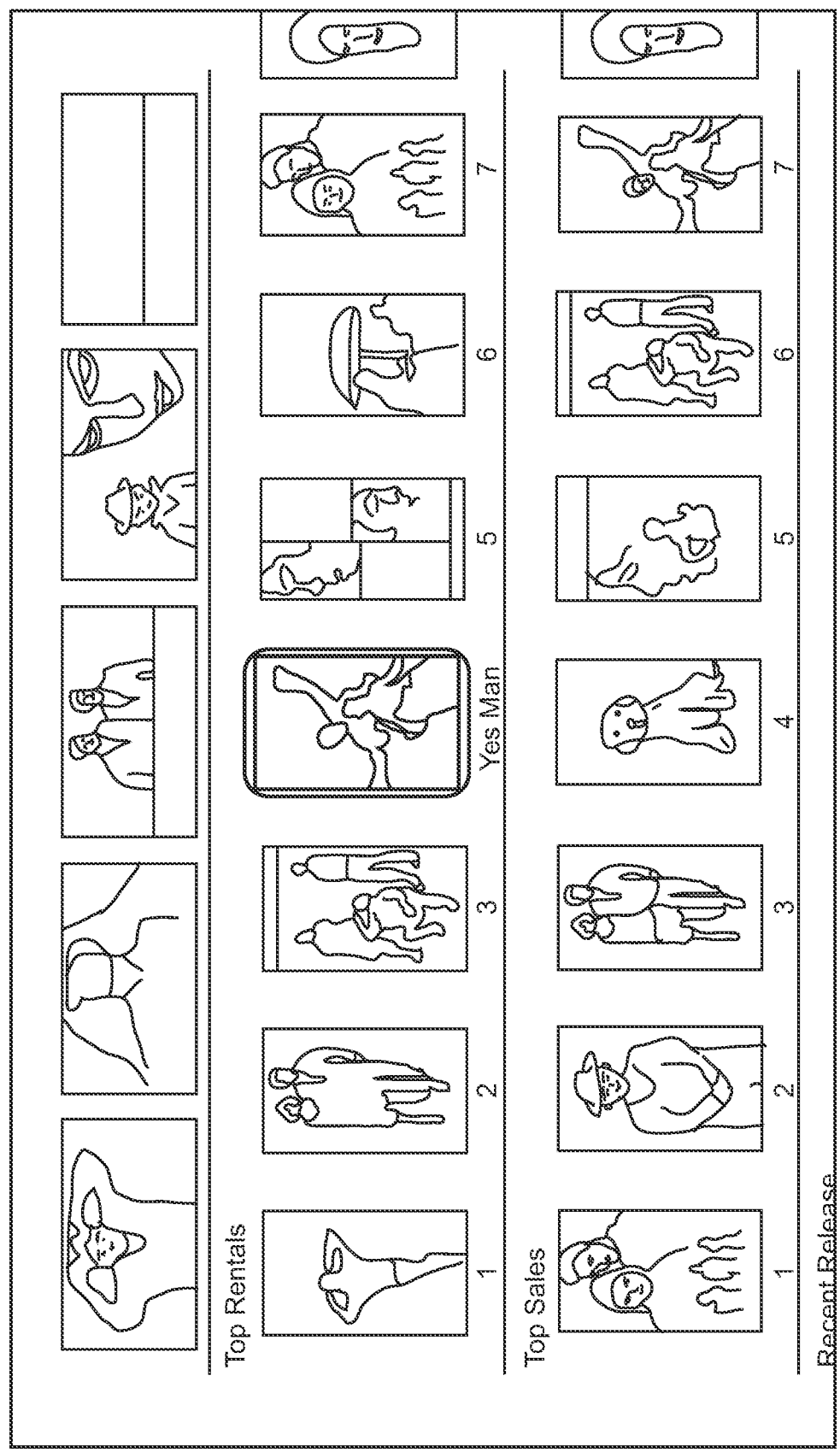
FIG. 7 illustrates an example menu graphical user interface embodiment.

Returning to the example of a multimedia application running on a remote device—in a menu context, a user can potentially browse media, by title, artist, media type, playlists, album name, genre (it should be understood that some of these categories for browsing media are more or less applicable to different media types such as movies or songs). In FIG. 7, a user can browse the menu interface by movie titles arranged in a list. In the menu context various inputs can be entered into the primary touch sensitive area to navigate the menu and make a selection. For example, and as shown in the table below, a user can swipe the interface in a desired direction, which can result in a scroll operation. As is known in the art, the speed of the gesture and the scrolling operation can be related. For example, a faster swipe gesture can result in a faster scroll operation and/or longer scroll duration.

Additionally the primary touch sensitive area can also receive tap gestures, which can select an item. Further, dragging a user's finger across the primary touch sensitive area 204 can move a selected or highlighted item.

TABLE 1

Menu Navigation Context

| Touch Action | Result |
|---|---|
| Single digit drag in the desired direction | Move selection |
| Single digit swipe in the desired direction | Scroll selection and ease out |
| Single digit tap in main selection area | Select item |

Figure 8:
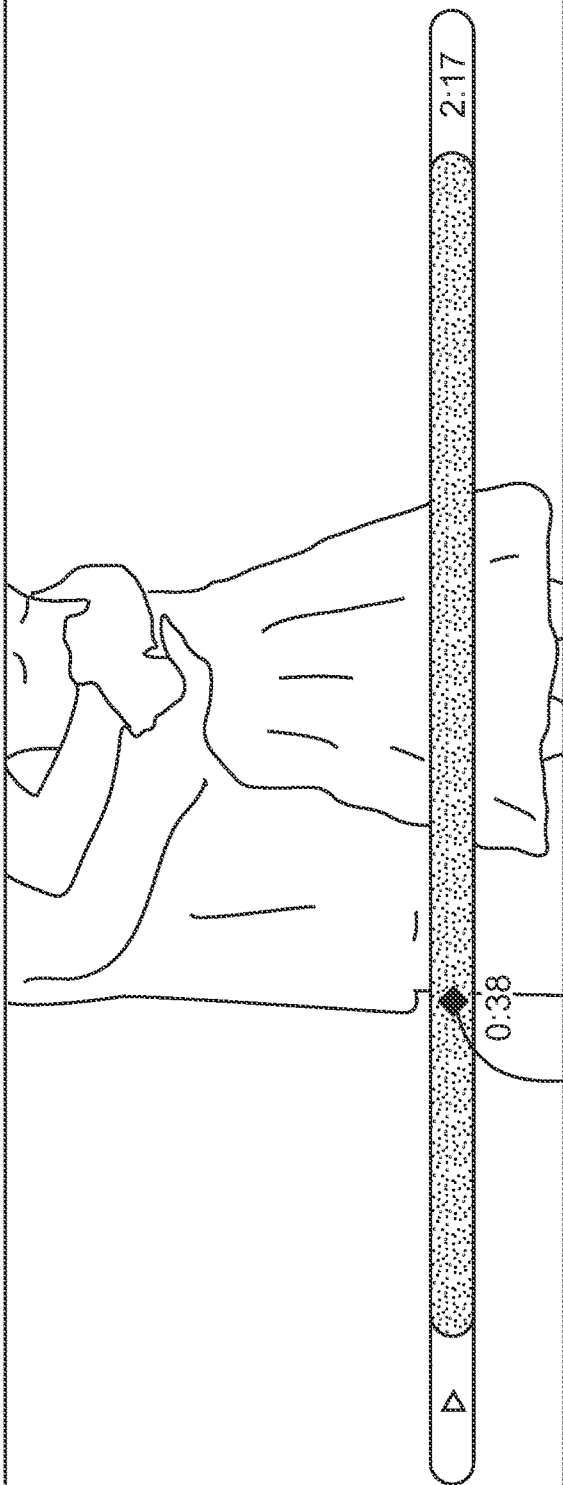
FIG. 8 illustrates an example media playback graphical user interface embodiment.

Many of the same actions can result in different outcomes or actions performed on or by the remotely controlled device in other contexts. For example, and as seen in the chart below, some of the same actions described above cause different results in the media playback context which is illustrated in FIG. 8. A single digit tap in the primary touch sensitive area can cause a media file to play or pause in the playback context as opposed to a selection in the menu context. Similarly, a drag action can result in a shuttle transport operation of shuttle 367. Swipes right and left can result in a fast forward right and left respectively as opposed to the scroll operation in the menu context. An upward swipe can cause an information display 365 to cycle through various information that a media player might have available to show. A downward swipe can show a chapter selection menu.

TABLE 2

Media Playback Context

| Touch Action | Result |
|---|---|
| Single digit tap in the selection area | Toggle Play/Pause |
| Single digit drag left/right | Shuttle transport to left/right |
| Swipe digit swipe left | Skip backwards 10 seconds |
| Swipe digit swipe right | Skip forwards 10 seconds |
| Swipe digit swipe up | Cycle Info Display |
| Swipe Digit swipe down | Show Chapter selection Menu |

Other inputs do not need to vary by context. For example, a tap in the menu area 206 returns to the previous menu screen. Holding a finger in the menu area returns to the top menu. Also some inputs into the primary touch sensitive area 204 will always result in the same action—a two-digit press and hold in the primary touch sensitive area 204 will return to the menu for the context that the device is currently displaying.

TABLE 3

Any Context

| Touch Action | Result |
|---|---|
| Single digit tap in menu area | Menu |
| Single digit press & hold in menu area | Top Menu |
| Two digit press & hold in main selection area | Context Menu |

In addition to the various touch inputs described above many more inputs are also possible. Nothing in the above discussion should be seen as limiting the available touch inputs or gestures that can be used with the described technology. For example, in additional to the one or two finger inputs described above, three or four finger inputs are also contemplated. Additionally, more complex gestures such as separating two or more fingers and providing inputs relative to each finger can also be useful. Such gestures are already known in the art such as rotating one finger around the other to rotate an onscreen image, or moving two fingers away from each other or towards each other can result in a zoom out or in operation. Many others are considered within the level of skill in the art.

Furthermore, while the term digit is referred to above and throughout the specification it is also not meant to be limiting. While is some embodiments a digit refers to a finger of a human hand, in some embodiments digit can refer to anything that is capable of being sensed by a capacitive device. In some embodiments, digit can also refer to a stylus or other object for inputting into a display-input device.

After the focused UI controller accepts an input it affects the UI of the remotely controlled device. In many cases this may be the first feedback that the user will receive that the proper command was given. Such a feedback loop increases the responsiveness of the system and allows the remote interface to be less complicated. However, in other embodiments, other types of feedback can be supplied. For example, audible feedback can be supplied to the user so she can at least know a command was issued. Alternatively the remote can vibrate or provide any other desirable type of feedback. The feedback can also be command specific, a different sound or vibration for each command is possible.

In some embodiments, the remotely controlled device may not have an event interpreter. In these embodiments, the remote would send the data representative of touch inputs to the remotely controlled device and the focused UI controller can be configured to interpret the data.

In some embodiments it can be useful to allow the remote to learn about changing menus or displays of the remote device. In such embodiments, a separate communications channel can be opened, for example using a hypertext transfer protocol for transferring information between the devices. To maintain remote performance most communications can be single direction communications for faster speed, but bidirectional communications can be used when needed. For example, even though most of the communications from the remote to the remotely controlled device are transferred using TCP, HTTP or DAAP can be used to inform the remote of special cases such as when additional information is available or that a keyboard is being displayed on the remotely controlled device. In such instances, a keyboard for example can be displayed on the remote and inputs into the keyboard can be transferred using the HTTP protocol. Similarly, when information such as that shown in FIG. 8 is available, and information button can be displayed on the remote to bring up information window 365.

Figure 9:
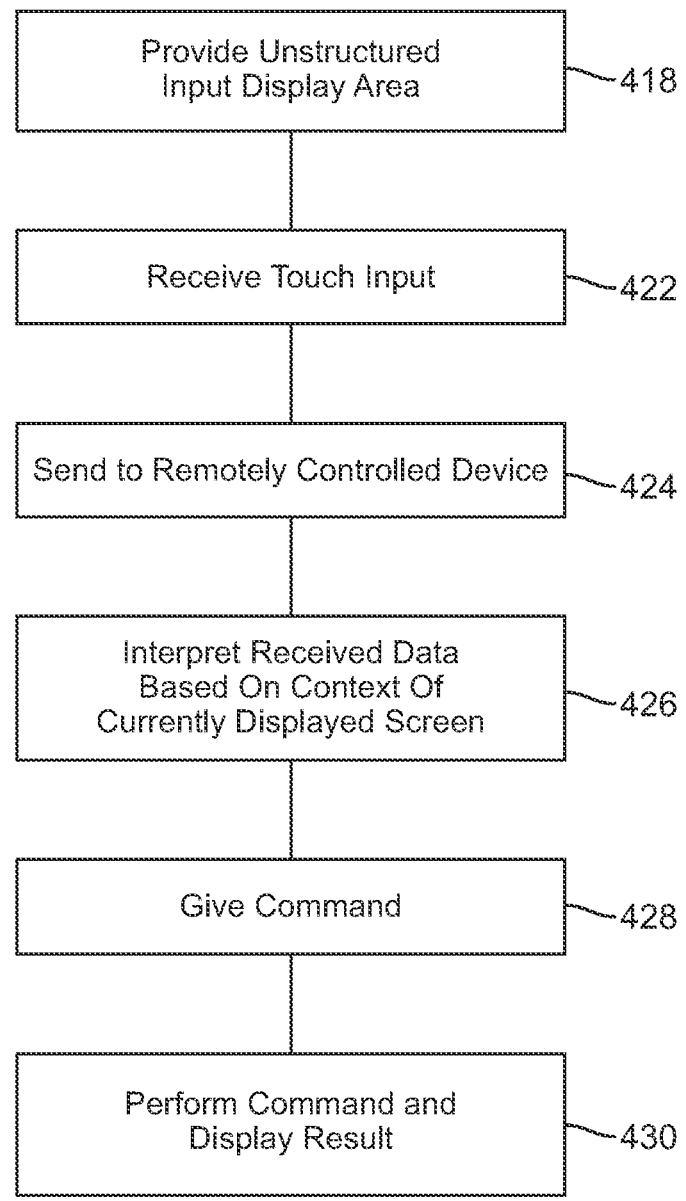
FIG. 9 illustrates an example method embodiment.
Figure 10:
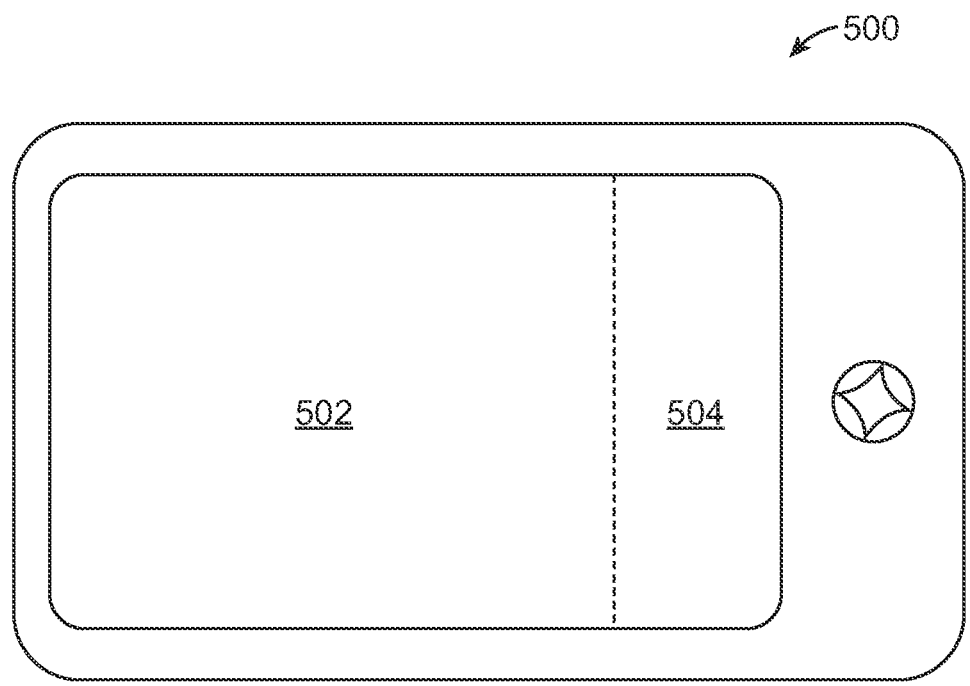
FIG. 10 illustrates an example interface embodiment for a remote control device.

FIG. 9 illustrates the method for controlling the remote device. In step 418, a remote application provides an unstructured touch sensitive area for receiving touch inputs from a user. The touch inputs are received and interpreted into at least touch start, touch end, move and duration data in step 422. The data is formatted and sent to the remotely controlled device in step 424.

In step 426, the remotely controlled device interprets the received data with knowledge of the context of the screen that is currently being displayed by the remotely controlled device. Depending on the inputs received and the context of the current display, the remotely controlled device interprets the data received from the remote and accepts the command in step 428 which causes the remotely controlled device to perform the command and display the result in step 430.

It will be appreciated that while the above description uses a media playback device with associated software, the technology is equally applicable to other remotely controlled devices such as televisions, DVR, DVD players, Blu-ray, cable boxes etc. For example, either the remotely controlled device can be programmed to accept and interpret generic touch screen interface data and respond to those inputs. Alternatively, the remote itself can be provided with instructions on how to communicate with almost any remotely controlled device. As long as either the remote or the remotely controlled device can interpret the touch data based on the context of what is currently being displayed or caused to be displayed by the remote device, the principles of the described technology can apply.

In some embodiments less or more touch sensitive areas are possible. However, additional touch sensitive areas having structured interfaces increase the possibility of accidental commands being input into the remote. The best interfaces provide an overall user experience wherein the user does not need to look at the remote to make a selection in most instances. However, it will be appreciated that if the user is not looking at the remote, in a touch environment wherein the entire device feels similar to the user, accidental inputs are possible and may even become likely if too many individually selectable items are available.

Several methods can be used to prevent accidental inputs. One of which, as described above, uses an accelerometer device to determine the devices orientation and based on that orientation determine what type of command the user is trying to enter. If the device is horizontal the user is probably not looking at the device and gestures are likely intended to control the remotely controlled device. However, if the device is more vertical, or angled so that the user can view the screen, the user is probably viewing the screen and inputs are more likely into the structured interface buttons. Another alternative is illustrated in FIG. 5 wherein the remote device 500 is rotated in a landscape orientation. In this orientation, the entire interface is unstructured and only the primary selection area 502 and the menu selection area 504 are present. This embodiment would eliminate accidental inputs by removing the structured portion of the interface when the user desired to only use the unstructured interface to enter touch gestures to control the remotely controlled device. When the device is rotated into the portrait orientation a structured interface can become available. Still yet another way to reduce unwanted inputs is to turn the display portion of the touch screen completely off regardless of the orientation of the device. In these embodiments only unstructured input into the primary selection area and menu area would be available. If the user wanted one of the structured options the screen could be turned back on by some actuation mechanism like a hardware button, shaking the device, or a touch gesture.

Additionally, and as described above, accidental inputs can be avoided by configuring the touch interface to accept any input that drifts into or out of a structured input as a input into the unstructured interface. In this way, only deliberate selections are registered.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such tangible computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the tangible computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Communication at various stages of the described system can be performed through a local area network, a token ring network, the Internet, a corporate intranet, 802.11 series wireless signals, fiber-optic network, radio or microwave transmission, etc. Although the underlying communication technology may change, the fundamental principles described herein are still applicable.

The various embodiments described above are provided by way of illustration only and should not be construed to limit the invention. For example, the principles herein may be applied to any remotely controlled device. Further, those of skill in the art will recognize that communication between the remote the remotely controlled device need not be limited to communication over a local area network but can include communication over infrared channels, Bluetooth or any other suitable communication interface. Those skilled in the art will readily recognize various modifications and changes that may be made to the present invention without following the example embodiments and applications illustrated and described herein, and without departing from the true spirit and scope of the present disclosure.

What is claimed is:

1. A method for remotely controlling a device, comprising:
receiving touch input data at a remotely controlled device from a remote controller including a touch screen input device, wherein the touch input data can be interpreted by the remotely controlled device as one of a plurality of potential commands in a first context of a graphical user interface (GUI) of the remotely controlled device and as another of the plurality of potential commands in a second context of the GUI of the remotely controlled device; and in response to receiving the touch input data:
interpreting the touch input data in combination with a current context of the GUI of the remotely controlled device to determine an appropriate command for the current context of the GUI;
updating the GUI of the remotely controlled device in response to the appropriate command; and
sending, from the remotely controlled device, information via a bidirectional communication protocol to the remote controller informing the remote controller of a context of the GUI of the remotely controlled device displaying a keyboard, wherein the remote controller is configured to display a keyboard on the touch screen input device at least partially in response to the information received via the bidirectional communication protocol.

2. The method of claim 1, wherein the received touch input data includes touch input data corresponding to touch inputs received at the remote controller in an unstructured portion of a touch screen interface.

3. The method of claim 1, wherein the touch input data comprises touch input information that includes touch start, touch move, touch end, and touch duration data.

4. The method of claim 1, wherein interpreting the touch input data to determine the appropriate command for the current context of the GUI results in determining a first command in a first GUI context and a second command in a second GUI context.

5. The method of claim 1, wherein the received touch input data is received from the remote controller via a unidirectional communication.

6. The method of claim 1, wherein the touch input data is received from the remote controller in packets of up to 50 bytes.

7. The method of claim 1, wherein the touch input data includes touch input information including a number of touch digits.

8. The method of claim 1, wherein, while receiving touch input data at the remotely controlled device from the remote controller, the remote controller is recognized by the remotely controlled device, and a first potential command of the plurality of potential commands is associated with a first action in the first context and the first potential command is associated with a second action different from the first action in the second context.

9. A non-transitory computer-readable storage medium, storing machine-executable instructions that, when executed by one or more processors of an electronic device, comprising a remotely controlled device, cause the remotely controlled device to perform operations comprising:
receiving touch input data at the remotely controlled device from a remote controller including a touch screen input device, wherein the touch input data can be interpreted by the remotely controlled device as one of a plurality of potential commands in a first context of a graphical user interface (GUI) of the remotely controlled device and as another of the plurality of potential commands in a second context of the GUI of the remotely controlled device; and
in response to receiving the touch input data:
interpreting the touch input data in combination with a current context of the GUI of the remotely controlled device to determine an appropriate command for the current context of the GUI;
updating the GUI of the remotely controlled device in response to the appropriate command; and
sending, from the remotely controlled device, information via a bidirectional communication protocol to the remote controller informing the remote controller of a context of the GUI of the remotely controlled device displaying a keyboard, wherein the remote controller is configured to display a keyboard on the touch screen input device at least partially in response to the information received via the bidirectional communication protocol.

10. The non-transitory computer-readable storage medium of claim 9, wherein the received touch input data includes touch input data corresponding to touch inputs received at the remote controller in an unstructured portion of a touch screen interface.

11. The non-transitory computer-readable storage medium of claim 9, wherein the touch input data comprises touch input information that includes touch start, touch move, touch end, and touch duration data.

12. The non-transitory computer-readable storage medium of claim 9, wherein interpreting the touch input data to determine the appropriate command for the current context of the GUI results in determining a first command in a first GUI context and a second command in a second GUI context.

13. The non-transitory computer-readable storage medium of claim 9, wherein the received touch input data is received from the remote controller via a unidirectional communication.

14. The non-transitory computer-readable storage medium of claim 9, wherein the touch input data is received from the remote controller in packets of up to 50 bytes.

15. The non-transitory computer-readable storage medium of claim 9, wherein the touch input data includes touch input information including a number of touch digits.

16. The non-transitory computer-readable storage medium of claim 9, wherein, while receiving touch input data at the remotely controlled device from the remote controller, the remote controller is recognized by the remotely controlled device, and a first potential command of the plurality of potential commands is associated with a first action in the first context and the first potential command is associated with a second action different from the first action in the second context.

17. A remotely controlled device, comprising:
one or more processors;
a display;
a communication interface;
memory; and
machine-executable instructions, stored in the memory, that when executed by the one or more processors cause the remotely controlled device to perform operations including:
receiving touch input data from a remote controller including a touch screen input device, wherein the touch input data can be interpreted by the remotely controlled device as one of a plurality of potential commands in a first context of a graphical user interface (GUI) displayed on the display of the remotely controlled device and as another of the plurality of potential commands in a second context of the GUI displayed on the display of the remotely controlled device; and
in response to receiving the touch input data:
interpreting the touch input data in combination with a current context of the GUI of the remotely controlled device to determine an appropriate command for the current context of the GUI;

updating the GUI of the remotely controlled device displayed on the display in response to the appropriate command; and sending, from the remotely controlled device, information via a bidirectional communication protocol to the remote controller informing the remote controller of a context of the GUI of the remotely controlled device displaying a keyboard, wherein the remote controller is configured to display a keyboard on the touch screen input device at least partially in response to the information received via the bidirectional communication protocol.

18. A system comprising:

a remote controller including:
- a touch screen input device configured to receive touch inputs;
- a communications interface configured to send touch input data corresponding to the touch inputs received by the touch screen input device;

a remotely controlled device configured to present a graphical user interface in a plurality of contexts, the remotely controlled device including:
- a communications interface for receiving the touch input data sent by the remote controller, wherein the received touch input data can be interpreted by the remotely controlled device as one of a plurality of potential commands in a first context of a graphical user interface (GUI) of the remotely controlled device and as another of the plurality of potential commands in a second context of the GUI of the remotely controlled device;
- one or more processors configured to:
  - interpret the touch input data in combination with a current context of the GUI to determine an appropriate command for the current context of the GUI;
  - update the GUI in response to the appropriate command; and
  - send, from the remotely controlled device, information via a bidirectional communication protocol to the remote controller informing the remote controller of a context displaying a keyboard, wherein the remote controller is configured to display a keyboard on the touch screen input device at least partially in response to the information received via the bidirectional communication protocol.

19. The remotely controlled device of claim 17, wherein the received touch input data includes touch input data corresponding to touch inputs received at the remote controller in an unstructured portion of a touch screen interface.

20. The remotely controlled device of claim 17, wherein the touch input data comprises touch input information that includes touch start, touch move, touch end, and touch duration data.

21. The remotely controlled device of claim 17, wherein interpreting the touch input data to determine the appropriate command for the current context of the GUI results in determining a first command in a first GUI context and a second command in a second GUI context.

22. The remotely controlled device of claim 17, wherein the received touch input data is received from the remote controller via a unidirectional communication.

23. The remotely controlled device of claim 17, wherein the touch input data is received from the remote controller in packets of up to 50 bytes.

24. The remotely controlled device of claim 17, wherein the touch input data includes touch input information including a number of touch digits.

25. The remotely controlled device of claim 17, wherein, while receiving touch input data at the remotely controlled device from the remote controller, the remote controller is recognized by the remotely controlled device, and a first potential command of the plurality of potential commands is associated with a first action in the first context and the first potential command is associated with a second action different from the first action in the second context.

* * * * *